United States Patent [19]

Hollowell

[11] Patent Number: 4,624,422

[45] Date of Patent: Nov. 25, 1986

[54] APPARATUS FOR LOCKING SAFETY BELT AGAINST EXTENSIVE MOVEMENT

[75] Inventor: William Hollowell, Pacific Palisades, Calif.

[73] Assignee: American Safety Equipment Corporation, Troy, Mich.

[21] Appl. No.: 758,103

[22] Filed: Jul. 23, 1985

[51] Int. Cl.⁴ .............................................. B60R 22/42
[52] U.S. Cl. ................................. 242/107.2; 280/806
[58] Field of Search ..................... 242/107.2; 280/801, 280/803, 806, 807; 297/478, 480

[56] References Cited

U.S. PATENT DOCUMENTS

| 4,437,623 | 3/1984 | Wyder | 242/107.2 |
| 4,451,062 | 5/1984 | Ziv | 242/107.2 X |
| 4,492,348 | 1/1985 | Ziv | 242/107.2 |
| 4,570,975 | 2/1986 | Kawaguchi et al. | 242/107.2 X |

Primary Examiner—John M. Jillions
Attorney, Agent, or Firm—Poms, Smith, Lande & Rose

[57] ABSTRACT

An apparatus for locking the seat belts of a vehicle against further extensive movement during an emergency. The belt passes through a belt clamp and a roller assembly movable with respect to the clamp. The roller assembly is set to detect inertial forces and/or accelerations of the belt of a predetermined magnitude and to lock against further rotation upon their detection, whereupon further movement of the belt in the extensive direction urges the assembly against the belt clamp, causing it to lock.

11 Claims, 12 Drawing Figures

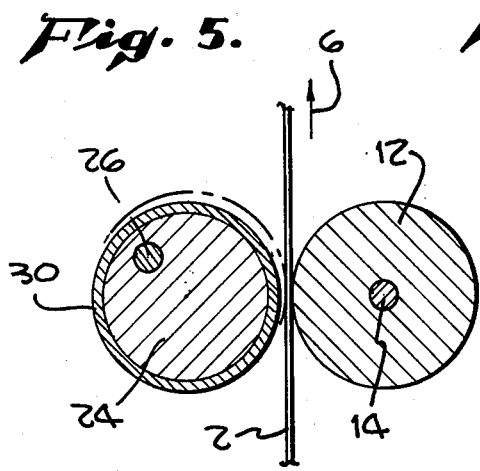
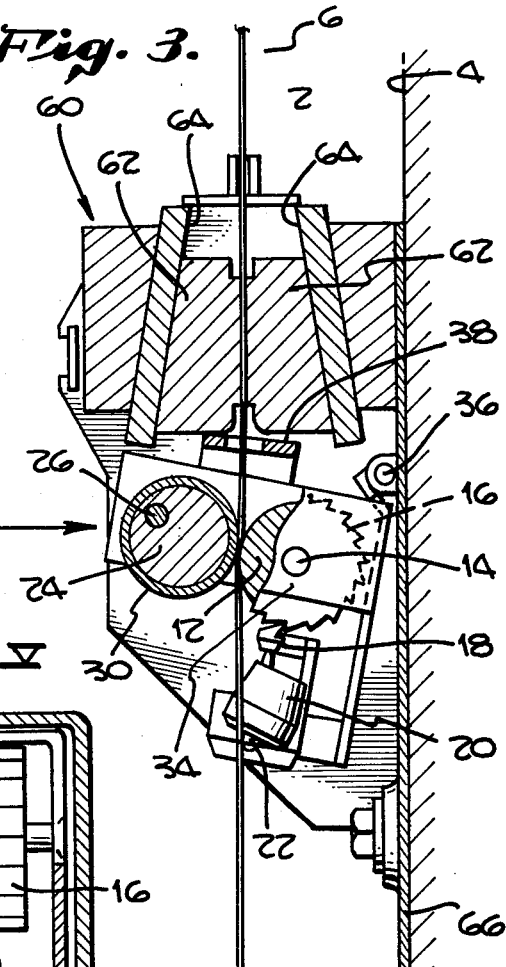
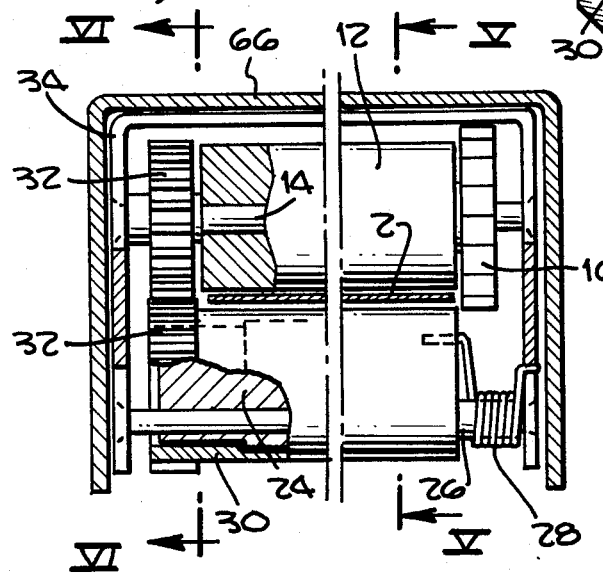
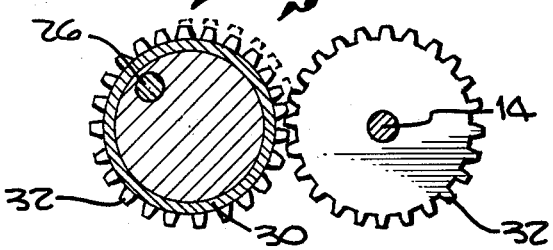
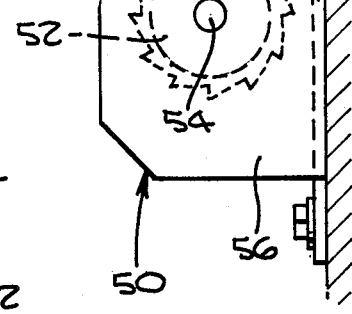

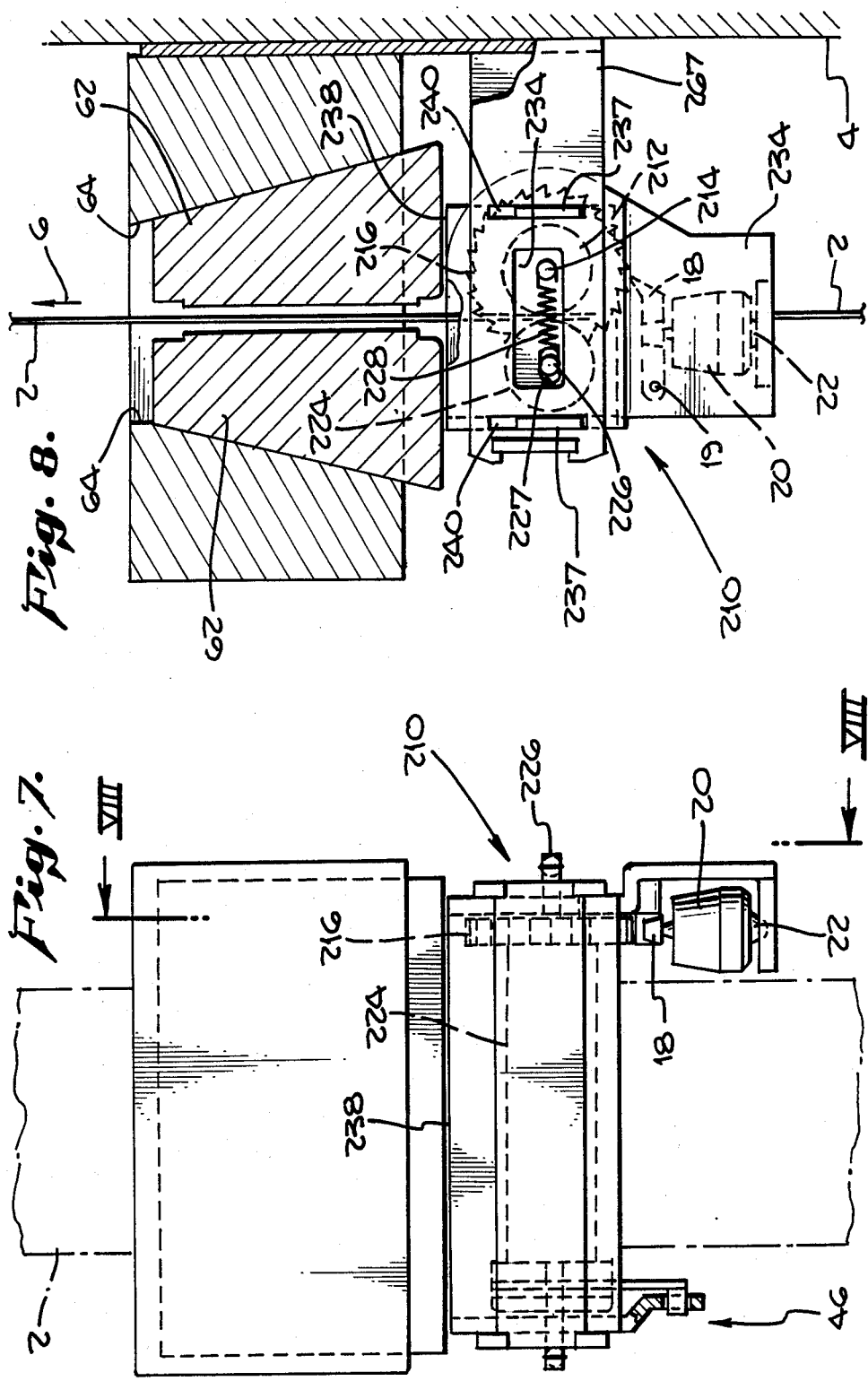

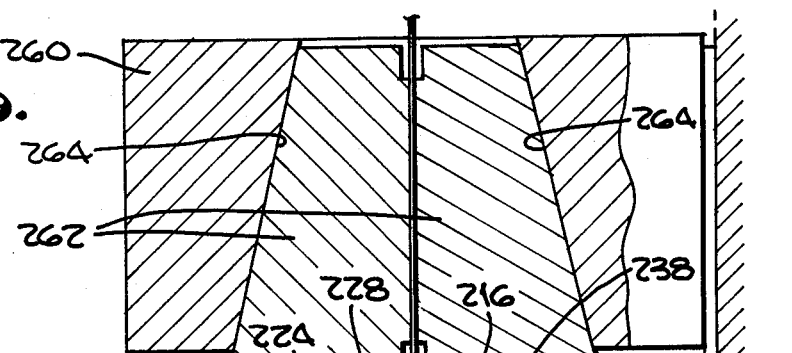
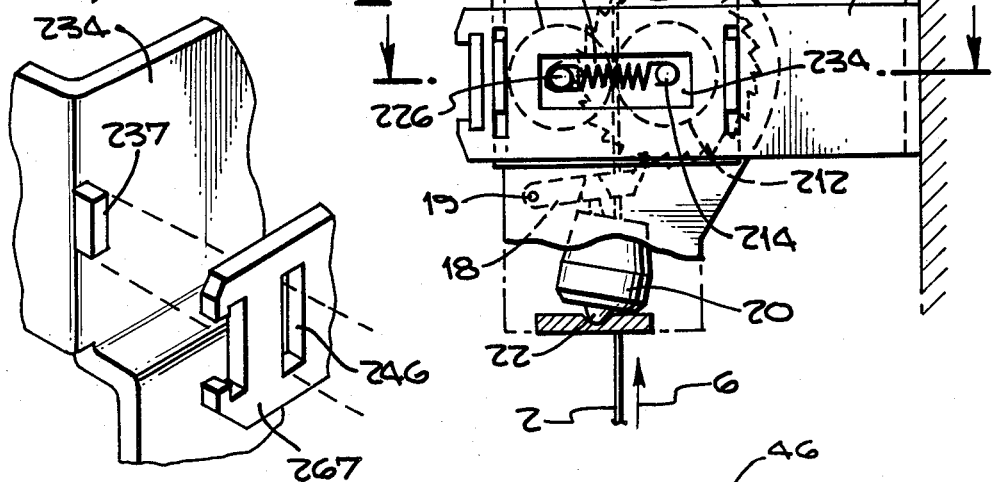
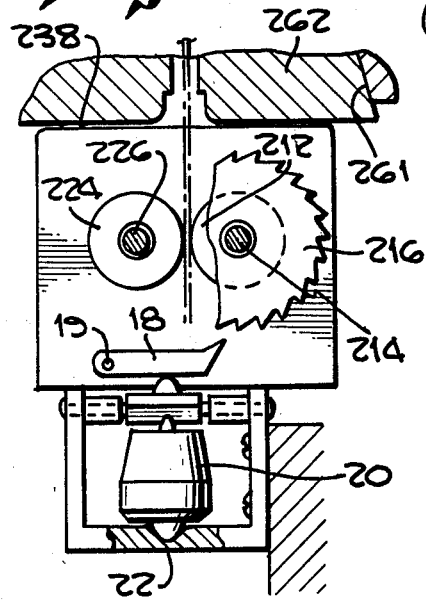
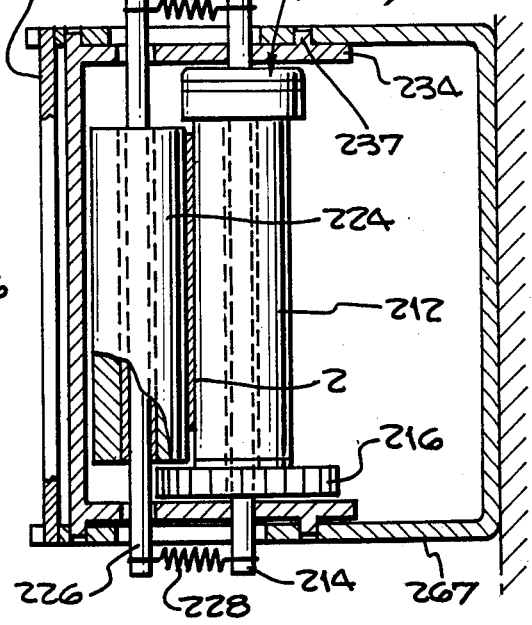

APPARATUS FOR LOCKING SAFETY BELT AGAINST EXTENSIVE MOVEMENT

BACKGROUND OF THE INVENTION

1. Field of the Invention

This invention relates, in general, to retractable safety belts in vehicles, and in particular, to an apparatus for locking the safety belts against further extension during emergency conditions, such as a forceful collision of the vehicle.

2. Summary of the Prior Art

Safety belts have come to be widely employed in the vehicles manufactured in this country within the last decade. These belts usually include at least a waist belt, and may also incorporate one or more belts passing across the chest of the wearer. Typically, the belts are retractably-retained within the vehicle by spring-wound reels attached to the structure of the vehicle which retain the belts in the retracted position until extended by the wearer across the wearer's body to mate with a belt retaining device, such as a quick-release buckle.

Devices have been developed heretofore for use in automotive vehicles for locking the safety belts by means of inertia sensors used in conjunction with the retractor reel which automatically lock the retractor reel against further extension of the belt in the event of an emergency, such as the sudden acceleration or deceleration of the vehicle. In testing such systems, it was found that, upon the locking of the reel itself, a certain amount of extension of the safety belt can still occur, depending upon the manner in which the belt is wound about the reel and the inertial force incident upon the belt as a result of the weight of the wearer's body. Thus, for heavier individuals, subject to forceful accelerations or decelerations, the belt has a tendency to "spool" and compress itself upon the reel, which permits an undesirable further movement of the belt in the extensive direction. As a consequence, locking devices have been developed which incorporate a belt-clamping device in addition to the inertially-locked reel for preventing the continued extension of the belt following lockup of the reel. Two such devices are disclosed in U.S. Pat. No. 4,451,062 to Ziv and U.S. Pat. No. 4,492,343 to Ziv, et al., and both assigned to the Assignee of the present invention.

In these prior art devices, the belt-clamping means comprises one or more clamping wedges slidably retained against one or more inclined-plane surfaces through which the belt passes. Movement of the wedges in the direction of further extension of the belt causes the wedges to move together to clamp the belt securely therebetween with a force which increases in proportion to the movement of the wedges in the extensive direction. In U.S. Pat. No. 4,451,062 above, the initial clamping movement of the wedge(s) is provided by a biasing means, comprising, in the two alternative exemplary embodiments, a resettable spring or an electrical solenoid. In U.S. Pat. No. 4,492,348, the biasing means for the clamping device comprises the inertially-locked retractor reel which is slidably-mounted for movement with respect to the clamping means such that, when the inertia reel is locked against further extensive movement of the belt, the reel is biased against the clamping means to cause the wedges to clamp the belt against further extensive movement.

In the first of these prior art references, the belt clamping means must be manually reset to release the belt from the clamped position. In the latter reference, although one of the embodiments disclosed resets automatically, it has been found that such inertia-reel-actuated clamps are sensitive to the amount of belt which is retracted onto the reel, i.e., the angular acceleration detected by the reel is different for the same inertial forces exerted upon the belt, depending upon the amount of belt material which is wound onto the reel.

SUMMARY OF THE INVENTION

It is therefore an object of the present invention to provide an improved belt-clamping actuation means which is automatically resetting.

It is a further object of the present invention to provide an improved belt-clamping actuation means whose ability to detect and respond to belt acceleration is independent of the amount of belt material wound onto the belt retractor reel.

It is yet a further object of the present invention to provide an improved means for actuation a seat belt clamp which is simple and inexpensive to fabricate, yet is safe and reliable in operation.

These and other objects of the present invention are preferably accomplished in a seatbelt retractor and locking apparatus in which is disposed, between a conventional retractor reel and a conventional belt-clampling means, a pair of rollers to pinch the belt therebetween, the rollers being lockable against rotation in response to acceleration-force-sensing means and/or to belt-acceleration-sensing means, the rollers being mounted on a chassis movable against a biasing means with respect to the clamping means to permit the chassis to be urged against the clamping means when the rollers are locked against rotation to actuate the clamping means to clamp the belt against further extensive movement.

DESCRIPTION OF THE DRAWINGS

These and other objects and advantages of the present invention will become evident to those skilled in the art from a consideration of the following specification in conjunction with the drawings, wherein:

FIG. 3 is a sectional side view of the first preferred embodiment in which the subject of the first preferred embodiment of the present invention is shown located between a conventional takeup reel to the left and a conventional pair of belt-clamping wedges mounted to the right;

FIG. 4 is a sectional view through the roller section of the first preferred embodiment of the present invention as revealed by the section IV—IV taken in FIG. 1, and in which two additional sectional views, V—V and VI—VI are taken;

FIG. 5 is a sectional view through the rollers of the first preferred embodiment as revealed by section V—V taken in FIG. 4;

FIG. 6 is a sectional view taken through a pair of gears located on the rollers as seen in the section VI—VI taken in FIG. 4;

FIG. 7 is a elevation view of a second preferred embodiment of the present invention in which sectional view VIII—VIII is taken;

FIG. 8 is the sectional side view through the second preferred embodiment of the present invention as revealed by the section VIII—VIII taken in FIG. 7 in which the belt-clamping wedges are shown in the unclamped mode;

FIG. 9 is the same sectional side view of the second preferred embodiment as shown in FIG. 8 in which the belt-clamping means is shown in the belt-clamping mode and a section X—X is taken through the rollers;

FIG. 10 is the sectional view through the rollers of the second preferred embodiment of the present invention as revealed by the sectional view taken in FIG. 9;

FIG. 11 is a detailed view of a guide means to permit the roller mounted frame of the second preferred embodiment to move with respect to the clamping means;

FIG. 12 is a sectional view taken into the side of the rollers of the second preferred embodiment of the present invention.

DESCRIPTION OF THE PREFERRED EMBODIMENTS

Figure 2:
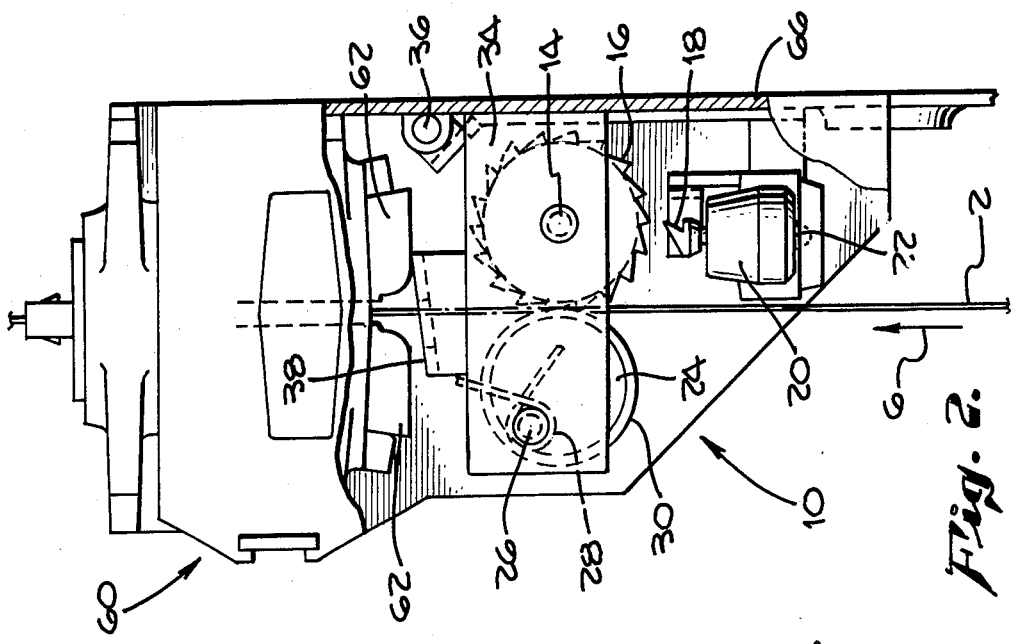
FIG. 2 is a sectional side view of the first preferred embodiment as revealed by the section II—II taken in FIG. 1.
Figure 1:
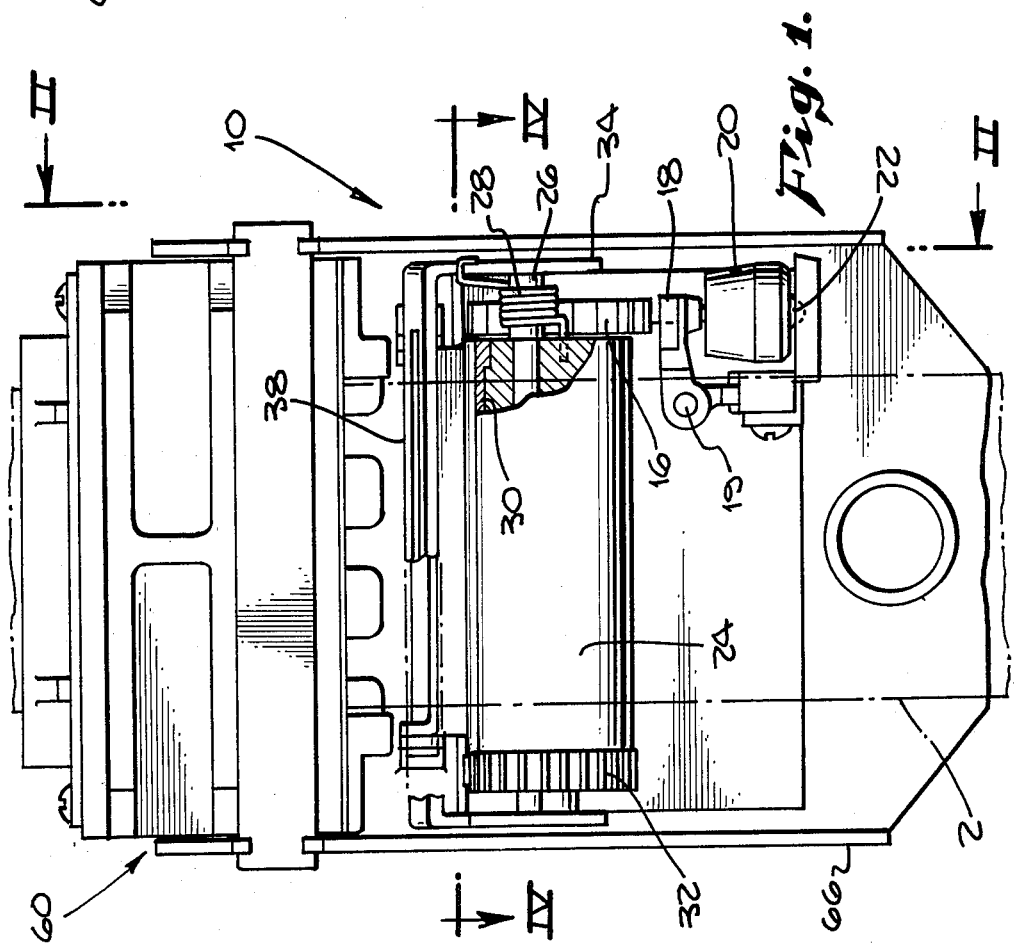
FIG. 1 is a elevation view of a first preferred embodiment of the present invention in which two views, II—II and IV—IV are taken.

FIGS. 1-6 illustrate a first preferred embodiment of the present invention 10 located between a conventional spring-wound belt retractor 50 and a belt-clamping device 60, both of which are rigidly mounted to the structure of a vehicle 4. FIG. 3 best illustrates the operation of the device 10 in a side elevation which is in partial section. A pair of rollers 12 and 30 pinch belt 2 between them for rolling contact with the belt. One of the rollers 12 rotates about an axle 14 and is lockable against rotation by means of a ratchet gear 16 which is affixed to the lockable roller 12. Gear 16 is locked against turning by the engagement of its teeth with locking pawl 18, which moves into contact with the gear 16 in response to a movement to either side of a pendulum weight 20 which is pivotally-mounted to toggle about point 22 in response to inertial forces applied to the vehicle 4. It is to be noted that, in the stationary position, roller assembly 10 is mounted with respect to gravity, which acts opposite to direction 6, such that pendulum weight 20 is centered and unaffected by the gravitational force.

Opposed to lockable roller 12 is the second roller 30 which, in the first preferred embodiment, is eccentrically-pinned on shaft 26 to swing against lockable roller 12, towards which it is urged by means of spring 28 to pinch belt 2 therebetween. A rotating sleeve on the outside of eccentric 24 permits rolling contact between belt 2 and eccentric roller 30 without sliding. By this eccentric mounting of roller 30 with respect to its central axis, the effect of extensive movement of belt 2 in direction 6 is to pull roller 30 more forcefully toward lockable roller 16 by means of the geometrical forces between sleeve 30 and roller 24, the effect of which is more forcefully to pinch the belt 2 between rollers 12 and 30 for rolling contact.

In the first preferred embodiment, it is contemplated that the rollers 12 and 30 will rotate freely about their respective axes in response to extensive movement of belt 2 in direction 6 unless, and until, a locking condition occurs in roller 12 in response to the actuation of pawl 18 into engagement with ratchet gear 16 in response to inertial forces acting on pendulum weight 20. Upon this occurrence, further extensive movement of belt 2 in direction 6 is converted through friction between belt 2 and rollers 12 and 30 into a force acting on the roller mounted bracket 34 which is pinned at point 36 to pivot roller assembly 10 against clamping members 62 along the line 38 of roller mounting bracket 34. By pivoting roller assembly 10 with respect the mounting frame 66 of clamp assembly 60, the mass of roller assembly 10 is effectively reduced and less force is required to actuate clamping means 60.

It is to be noted that in the embodiments illustrated, it is contemplated that rollers 12 and 30 will rotate freely in contact with belt 2 and that movement of roller assembly 10 with respect to clamping assembly 60 will occur only upon lockup of roller 12. To enhance the frictional gripping force between the rolling surfaces of rollers 12 and 30 an optional pair of mating gears 32 having the same diameter may be incorporated along the length of the rolling surfaces of rollers 12 and 24 to lock rotation of these two surfaces together such that, when roller 24 is locked against rotation, opposing roller surface 30 is also locked against rotation.

In both embodiments illustrated in the figures, the inertially-activated pawl 18 and its actuating pendulum weight 20 are mounted on an extension of roller housing 34 such that these components are fixed relative to, and move with, roller assembly 10.

A second preferred embodiment of the present invention is illustrated in FIGS. 7-12. In this embodiment, roller assembly 210 translates without rotation with respect to clamping assembly 60 to contact the wedges 62 of clamping assembly 60 along line 238 after lockup is initiated.

In this embodiment, rollers 212 and 224 are biased together to grip belt 2 therebetween by means of spring means 228 acting transversely to the axles 214 and 226 of the two rollers 212 and 224, respectively. In the second embodiment illustrated (see FIG. 8), locking roller 212 is rotatably-mounted in roller bracket 234, while opposing roller 224 is provided with a pair of mounting journals 227 which are slotted towards the axis of locking roller 214 to permit roller 224 to move toward roller 212. Roller bracket 234 is slidably-retained in extension flanges 267 formed into clamp-mounting bracket 266 by means of sliding tabs 237 formed onto roller bracket 234 which move in apertures 240 in mounting flanges 267. Mounting flanges 267 are tied together above roller assembly 210 by means of tie-strap 241.

Again, as in the first preferred embodiment, pinching rollers 212 and 224 may be provided optionally with a pair of mating coupling-gears (not illustrated) affixed to their axles 214 and 226 to couple the rotation of 212 and 224 together to enhance the locking effect between the rollers on belt 2 upon lockup.

It is especially contemplated that, in both preferred embodiments illustrated, an optional, web-acceleration sensing and lockup mechanism 46 may be incorporated into the roller mechanism of roller assemblies 10 or 210, respectively, to provide a "dual-sensing" mechanism that is sensitive both to inertial forces transmitted through vehicle 4 to locking pawl 18 and to accelerations within belt 2 in the extensive direction 6 of a predetermined value. By incorporation of this second sensing and lockup mechanism 46 into the roller mechanism of roller assemblies 10 and 210, the problem associated with placing that device on the reel 52 of takeup-assembly 50, namely, a varying sensitivity to belt acceleration with varying amounts of belt 2 on reel 52 is eliminated, since the radii of the rollers of either roller assembly 10 or 210 in contact with belt 2 remains constant, regardless of the amount of belt material extended from, or retracted on, reel 52.

In its intended application, the subject of the present invention is particularly intended to be used in conjunction with a belt clamping means 60 of the type illustrated in the figures. This clamping means comprises a pair of opposed, clamping wedges 62 slidably retained within a pair of inclined-plane surfaces 64 that are part of the clamping assembly 60. Thus, when clamping wedges 62 translate in the direction of belt extension 6, they close together to clamp belt 2 therebetween and are capable of generating a tremendous amount of clamping force in response to a small movement. Moreover, clamping wedges 62 are partially self-activating in the sense that, once frictional forces between belt 2 and clamping wedges 62 has been initiated as a consequence of the sliding of belt 2 in direction 6 while in contact with the clamping surfaces of wedges 62, the effect is to draw wedges 62 in the direction 6, resulting in increasingly-forceful clamping of belt 2 between wedges 62. Thus, only relatively small movements of roller actuators 10 or 210, and accompanied only by relatively small forces against either of clamping wedges 62, are necessary to achieve effective lockup of the belt 2.

The particular geometry and configurations of the two preferred embodiments shown are for illustrative purposes only, and alternative embodiments which will achieve the same or substantially similar results will readily suggest themselves to those skilled in the art to which this invention pertains. Accordingly, the scope and the spirit of my invention should be limited only by the following claims.

I claim:

1. In a vehicle having extensible and retractable safety belts on spring-wound, take-up reels to restrain the occupants therein during an emergency condition of the type which includes means mounted in said vehicle for clamping said belts against further extension by the operation of an actuator means against said clamping means in response to the movement of an inertially-activated pawl, an improved said actuator means, comprising:

means for releasably-pinching said belt in response to said movement of said pawl, means for mounting said pinching means for movement with respect to said clamping means in response to said extensive movement of said belt when said pinching means is activated such that said pinching means is urged against said clamping means to clamp said belt against further extensive movement.

2. The device recited in claim 1, wherein said pinching means further comprises:

a. a plurality of opposed, spaced rolling surfaces to pinch said belt therebetween for rolling contact with said belt substantially without sliding, at least one of which rolling surfaces is lockable against rotation, such that said extensive movement of said belt therebetween causes said surfaces to rotate freely when said at least one lockable surface is unlocked and to exert a force upon said at least one rolling surface in the direction of said extensive movement when said at least one surface is locked; and b. said mounting means further being movable with respect to said clamping means, such that, when said at least one lockable rolling surface is locked, said mounting means is urged against said clamping means by said force exerted upon said at least one lockable rolling surface by said belt to clamp said belt against further extensive movement.

3. The device recited in claim 2, wherein:

said rolling surfaces further comprise:

a. a pair of parallel rollers, at least one of which is biased toward the other to pinch said belt therebetween with rolling contact with said belt substantially without sliding, at least one of which said rollers is lockable against rotation in response to said movement of said inertially-activated pawl;

b. means for biasing said at least one roller toward the other;

c. means for locking said at least one roller against rotation in response to said movement of said inertially-activated pawl; and said means for mounting further comprises:

d. a mounting bracket for mounting said rollers, said bracket further being retained to be movable with respect to said clamping means in a direction toward, and away from, said clamping means such that, when said at least one lockable roller is locked, said bracket is urged against said clamping means by said force exerted upon said at least one lockable rolling surface by said belt to clamp said belt against further extensive movement.

4. The device recited in claim 3 wherein:

said means for locking said at least one lockable roller further comprises:

a toothed surface upon the radius of said at least one lockable roller, said teeth engagable with said pawl to prevent said roller from turning when said teeth are engaged; and said means for biasing at least one roller toward the other further comprises at least one spring.

5. The device recited in claim 3, wherein:

said bracket is pivotally-mounted with respect to said clamping means to permit said bracket to pivot toward, and away from, said clamping means such that, when said at least one lockable roller is locked, said bracket is urged against said clamping means by said force exerted upon said at least one lockable rolling surface by said belt.

6. The device as recited in claim 3, wherein:

said bracket is slidably-mounted with respect to said clamping means to permit said bracket to slide in a direction toward, and away from, said clamping means such that, when said at least one lockable roller is locked, said bracket is urged against said clamping means by said force exerted upon said at least one lockable rolling surface by said belt.

7. The device recited in claim 3 wherein:

said other roller is pivotally-mounted on an axis eccentric to the centerline of said other roller, said other roller further having a radial surface in contact with said belt which is freely rotatable with respect to said centerline, said roller further being mounted with respect to said lockable roller such that, when said lockable roller is locked against rotation, movement of said belt in said extensive direction causes said other roller to pivot against said lockable roller, whereby the force with which said belt is pinched between said rollers is increased.

8. The device as recited in claims 3, 4, 5, 6 or 7, further comprising:

means for coupling rotation of said rollers together such that, when said at least one lockable roller is locked against rotation, said other roller is also locked against rotation.

9. The device recited in claim 8, wherein said means for coupling rotation of said rollers together comprises a pair of engaged, axially-mounted gears of substantially the same diameter on said rollers.

10. The device recited in claims 1, 2, 3, 4, 5, 6 or 7, in which said clamping means further comprises:
   a. a pair of opposed, planar surfaces fixed to said vehicle that converge in the direction of said extensive movement of said belt in an acute angle which is bifurcated by the plane of said belt; and
   b. a pair of spaced, parallel and opposed clamping wedges slidably-engaged between said planar surfaces, having first surfaces parallel to, and in contact with, said planar surfaces, and a pair of belt-clamping surfaces between which said belt passes, such that upon the application of a force to said wedges in the direction of said extensive movement, said wedges are caused to clamp said belt therebetween with a force which increase proportionately with the distance travelled by said wedges in said extensive direction.

11. The device as recited in claim 9, wherein said means for clamping said belt against further extensive movement comprises:
   a. a pair of opposed, planar surfaces fixed to said vehicle that converge in the direction of said extensive movement of said belt in an acute angle which is bifurcated by the plane of said belt; and
   b. a pair of spaced, parallel and opposed clamping wedges slidably-engaged between said planar surfaces, having the first surfaces parallel to, and in contact with said planar surfaces, and a pair of belt-clamping surfaces between which said belt passes, such that upon the application of a force to said wedges in the direction of said extensive movement, said wedges are caused to clamp said belt therebetween with a force which increases proportionately with the distance travelled by said wedges in said extensive direction.

* * * * *